J. PRICE.
LAWN SPRINKLER.
APPLICATION FILED FEB. 26, 1912.

1,052,620.

Patented Feb. 11, 1913.

Witnesses
Harold O. Van Antwerp
Anna De Windt

Inventor
James Price
By Luther V. Moulton
Attorney

UNITED STATES PATENT OFFICE.

JAMES PRICE, OF HOLLAND, MICHIGAN.

LAWN-SPRINKLER.

1,052,620.

Specification of Letters Patent.  Patented Feb. 11, 1913.

Application filed February 26, 1912. Serial No. 679,944.

*To all whom it may concern:*

Be it known that I, JAMES PRICE, a citizen of the United States of America, residing at Holland, in the county of Ottawa and State of Michigan, have invented certain new and useful Improvements in Lawn-Sprinklers; and I do hereby declare the following to be a full, clear, and exact description of the invention, such as will enable others skilled in the art to which it appertains to make and use the same.

My invention relates to improvements in lawn sprinklers and its object is to provide a cheap, convenient and adjustable device for the purpose.

My invention consists essentially of a base having an upright support thereon, upon which support is pivotally mounted a receiving chambered member adjustably secured by a pivot bolt having a wing nut thereon, said member having on the other end a suitable spraying device, and also being provided with a side branch or nipple to which the usual garden hose may be attached to supply the chamber with water under pressure, as will more fully appear by reference to the accompanying drawings, in which:—

Figure 1:
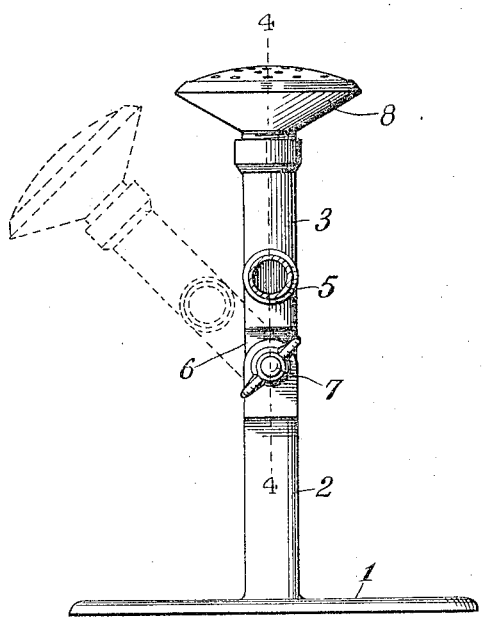
Figure 2:
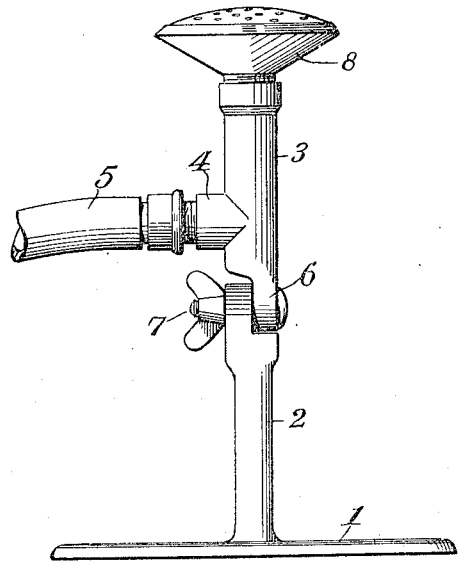
Figure 3:
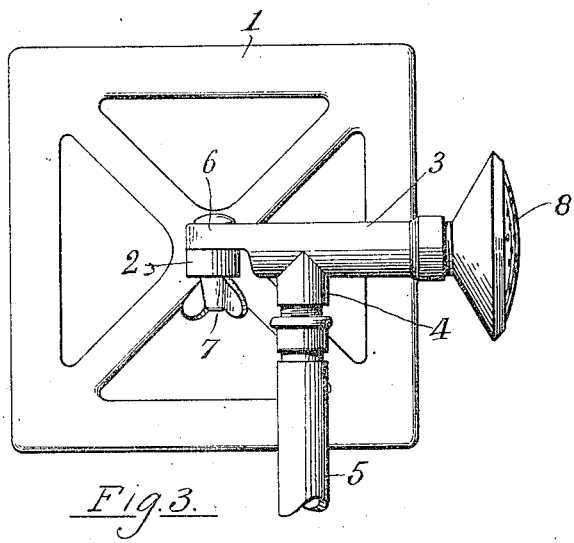
Figure 4:
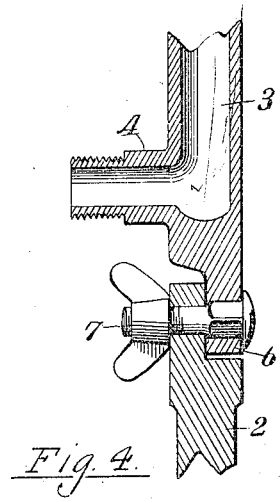

Figure 1 is an elevation of a device embodying my invention; Fig. 2 the same shown at right angles to Fig. 1; Fig. 3 a plan view of the same; and Fig. 4 an enlarged detail of the pivot shown in vertical section on the line 4—4 of Fig. 1.

Like numbers refer to like parts in all of the figures.

1 represents a base of any convenient form having thereon an upwardly projecting support or post 2 to the upper end of which is pivotally connected a receiving chambered member 3 by means of a perforated extension 6 on the lower end of the said member through which extension and the support extends a bolt 7 provided with a wing nut whereby said member is adjustably held in various positions to properly direct the spray from the sprinkler head either vertically or inclined in either opposite direction at pleasure.

The upper end of the chambered member is provided with a sprinkler head 8 of any convenient form, a rose sprinkler being shown, and the said member is also provided with a side branch or nipple 4 projecting in a direction parallel with the axis of the pivot to which may be attached the of the usual garden hose 5 to supply water under pressure to the chamber in said member. By attaching the hose at the side of the member and projecting parallel with the axis of the pivot the described adjustment of the said member is permitted.

From the foregoing description the operation of my device is obvious. By means of this structure the water is directed either vertically or inclined in either direction about the axis of the pivot bolt as occasion may require.

What I claim is:—

1. A lawn sprinkler, comprising a base, a post projecting upward from the base, a receiving chambered member pivoted at one end to the post and having a sprinkler at the other end and means for connecting a hose to the said member at one side of the same, and projecting substantially parallel with the axis of the pivot.

2. A lawn sprinkler, comprising a base, a post projecting upward from the base, a receiving chambered member having an extension at the lower end attached to the upper end of the post by a pivot bolt having a wing nut, a sprinkler on the upper end of the chamber and a side branch or nipple on the said member adapted to receive a garden hose and projecting substantially parallel with the axis of the pivot.

In testimony whereof I affix my signature in presence of two witnesses.

JAMES PRICE.

Witnesses:
RAYMOND VISSCHER,
W. J. GARROD.